(12) United States Patent
Cole et al.

(10) Patent No.: US 7,524,443 B2
(45) Date of Patent: Apr. 28, 2009

(54) MONITORING AND CONTROL SYSTEM FOR MECHANICAL PRESS

(75) Inventors: John R. Cole, Akron, OH (US); Normal Robert Knoedler, Salem, OH (US)

(73) Assignee: Rogers Industrial Products Inc., Akron, OH (US)

(*) Notice: Subject to any disclaimer, the term of this patent is extended or adjusted under 35 U.S.C. 154(b) by 445 days.

(21) Appl. No.: 11/499,575

(22) Filed: Aug. 4, 2006

(65) Prior Publication Data

US 2008/0029916 A1 Feb. 7, 2008

(51) Int. Cl.
*B29C 43/58* (2006.01)

(52) U.S. Cl. .................. 264/40.1; 264/40.5; 425/29; 425/136; 425/149; 425/170; 425/173

(58) Field of Classification Search .............. 425/29, 425/136, 149, 150, 170, 173; 264/40.1, 40.5
See application file for complete search history.

(56) References Cited

U.S. PATENT DOCUMENTS

| | | | | |
|---|---|---|---|---|
| 2,242,795 A * | 5/1941 | Soderquist | .................. | 425/29 |
| 2,559,377 A * | 7/1951 | Soderquist | .................. | 425/149 |
| 3,108,470 A * | 10/1963 | Martin | .................. | 73/770 |
| 3,948,088 A | 4/1976 | Shepherd | | |
| 4,195,563 A | 4/1980 | Budraitis et al. | | |
| 4,274,282 A | 6/1981 | Budraitis et al. | | |
| 4,305,299 A | 12/1981 | Serata | | |
| 4,312,241 A | 1/1982 | Budraitis | | |
| 4,335,439 A | 6/1982 | St. Denis | | |
| 4,370,116 A * | 1/1983 | Groom | .................. | 425/150 |
| 4,466,477 A * | 8/1984 | Alofs | .................. | 164/151.2 |
| 4,493,362 A | 1/1985 | Moore et al. | | |
| 4,554,534 A | 11/1985 | Jones | | |
| 4,633,720 A | 1/1987 | Dybel et al. | | |
| 4,671,124 A | 6/1987 | Seliga | | |
| 4,685,876 A * | 8/1987 | Loscei | .................. | 425/150 |
| 4,766,758 A | 8/1988 | Lucas et al. | | |
| 4,866,429 A | 9/1989 | Granere | | |
| 5,119,311 A | 6/1992 | Gold et al. | | |
| 5,440,499 A | 8/1995 | Rasmussen | | |
| RE35,996 E | 12/1998 | Rasmussen | | |
| 6,941,820 B2 * | 9/2005 | Lee | .................. | 73/860 |

OTHER PUBLICATIONS

Analog Inductive Sensor Product Specifications from Balluff, GmbH catalog, dated Jul. 19, 2006.

* cited by examiner

*Primary Examiner*—James Mackey
(74) *Attorney, Agent, or Firm*—Tarolli, Sundheim, Covell & Tummino LLP (57) ABSTRACT

A system (100) for controlling the operation of a mechanical press (10) having a side link (60) for applying squeeze to a mold (80) includes a dial indicator (120) mounted to the side link. An actuator member (170) has a first end (172) connected to the side link (60) and an opposite second end (200) engaging the dial indicator (120). The actuator member (170) is configured to move relative to the side link (60) and actuate the dial indicator (200) in response to elongation of the side link. The dial indicator (200) indicates the magnitude of the squeeze applied by the side link (60). A strain transducer (150) is mounted to the side link (60). The strain transducer (150) includes a sensor (152) that is operative to provide a signal responsive to movement of the actuator member (170) relative to the side link (60).

16 Claims, 5 Drawing Sheets

MONITORING AND CONTROL SYSTEM FOR MECHANICAL PRESS

TECHNICAL FIELD

The present invention relates to a mechanical press. More particularly, the present invention relates to a system, method, and apparatus for monitoring and controlling the operation of a mechanical press through strain measurement.

BACKGROUND OF THE INVENTION

There are a variety of industrial processes and applications that utilize a press to produce articles of manufacture. For example, a press may be used to apply pressure or "squeeze" to a mold to help seal the mold cavity for pressurization during a molding process. In one particular process or application, a press is used to apply squeeze to a tire curing or vulcanizing mold to help seal the mold cavity for pressurization during the curing/vulcanizing process.

There are a variety of press types or designs that may be used to apply squeeze to a mold. One particular type of press is a vertical mechanical press that includes upper and lower beams to which mating mold halves are attached. The mechanical press also includes side links for moving the beams relative to each other. Typically, the side links are used to move the upper beam downward toward the lower beam to close and apply squeeze to the mold and upward away from the lower beam to open the mold.

The mechanical press includes a mechanical drive for actuating the side links to cause relative movement between the beams. For example, the side links may have an eccentric connection with crank gears that are supported on the press for rotation about an axis. An electric motor may be used to rotate the pinion gears which impart rotation of the crank gears to actuate the side links.

In the art of tire curing, it is desirable that the press applies the proper amount of squeeze to the tire curing mold. If the squeeze is too high, the mold or the press may be damaged. If the squeeze is too low, tire rubber ("flash") may leak from between the mold halves, the tire may be defective, or high pressure steam may escape the mold. Because of this, it is desirable to monitor the amount of squeeze that is applied to the mold during the tire curing process. One method by which the amount of squeeze can be monitored is through the measurement and monitoring of strain in the side links of the tire curing press.

SUMMARY OF THE INVENTION

The present invention relates to a system for controlling the operation of a mechanical press having a side link for applying squeeze to a mold. The system includes a dial indicator mounted to the side link. An actuator member has a first end connected to the side link and an opposite second end engaging the dial indicator. The actuator member is configured to move relative to the side link and actuate the dial indicator in response to elongation of the side link. The dial indicator indicates the magnitude of the squeeze applied by the side link. A strain transducer is mounted to the side link. The strain transducer includes a sensor that is operative to provide a signal responsive to movement of the actuator member relative to the side link.

The present invention also relates to an apparatus for indicating squeeze placed on a mold by a press having a side link for applying the squeeze. The apparatus includes a dial indicator mounted to the side link and including a dial actuator. An actuator member has a first end connected to the side link and an opposite second end engaging the dial indicator. The actuator member is configured to displace the dial actuator in response to elongation of the side link when applying squeeze. The dial actuator actuates the dial indicator in response to the displacement and causes the dial indicator to indicate the magnitude of the squeeze applied by the side link. A strain transducer is mounted to the side link. The strain transducer includes a sensor operative to provide a signal responsive to the displacement of the dial actuator. The signal is indicative of the magnitude of the squeeze applied by the side link.

The present invention also relates to a system for controlling the operation of a mechanical press having at least one side link for applying squeeze to a mold. The system includes an actuator member movable relative to the side link in response to elongation of the side link. An inductive distance sensor is mounted to the side link. The inductive distance sensor is operative to provide a signal responsive to movement of the actuator member relative to the side link. A controller receives the signal from the inductive distance sensor and determines the magnitude of the squeeze applied by the side link in response to the signal.

The present invention also relates to an apparatus including a tire curing press. The tire curing press includes an upper beam, a lower beam, and at least one side link. The side links are actuatable to move the upper beam relative to the lower beam to apply squeeze to at least one tire curing mold supported in the tire curing press. An actuator member is movable relative to the side link in response to elongation of the side link. An inductive distance sensor mounted to the side link. The inductive distance sensor is operative to provide a signal responsive to movement of the actuator member relative to the side link. A controller receives the signal from the inductive distance sensor and determines the magnitude of the squeeze applied by the side link in response to the signal.

The present invention further relates to a method for determining the amount of squeeze placed on a mold by a press having a side link for applying the squeeze. The method includes the step of providing an actuator member having a first end connected to the side link. The method also includes the step of measuring elongation of the side link via a mechanical dial indicator mounted to the side link. The dial indicator includes a dial actuator for actuating the dial indicator. The actuator member has a second end that engages the dial actuator to cause axial displacement of the dial actuator in response to elongation of the side link when applying squeeze. The method includes the further step of measuring elongation of the side link via a strain transducer mounted to the side link. The strain transducer includes a sensor operative to provide a signal responsive to the axial displacement of the dial actuator. The signal is indicative of the magnitude of the squeeze applied by the side link.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF AN EMBODIMENT

Figure 1:
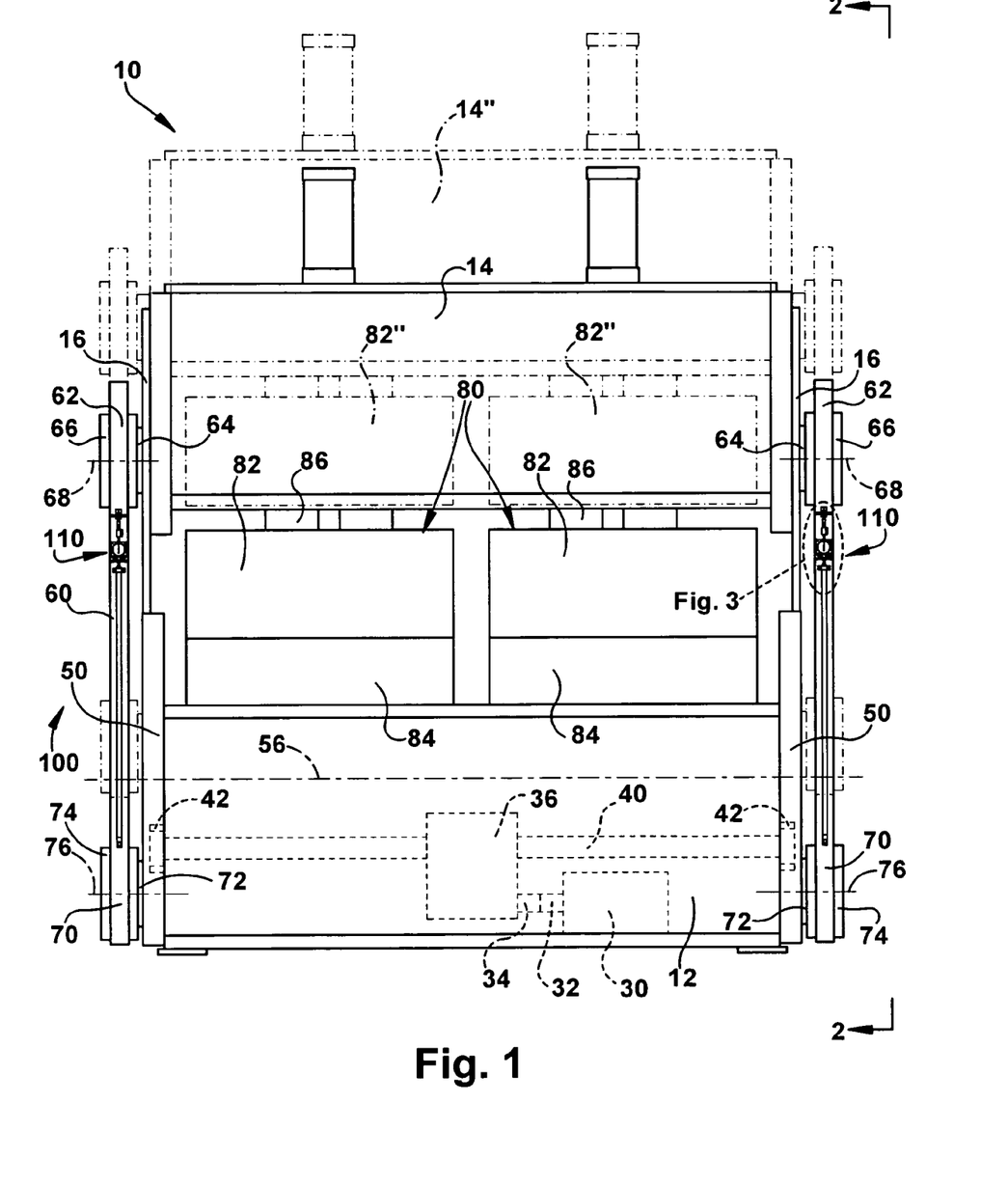
FIG. 1 is a front view of a mechanical tire curing press outfitted with a monitoring and control system in accordance a first embodiment of the present invention.
Figure 2:
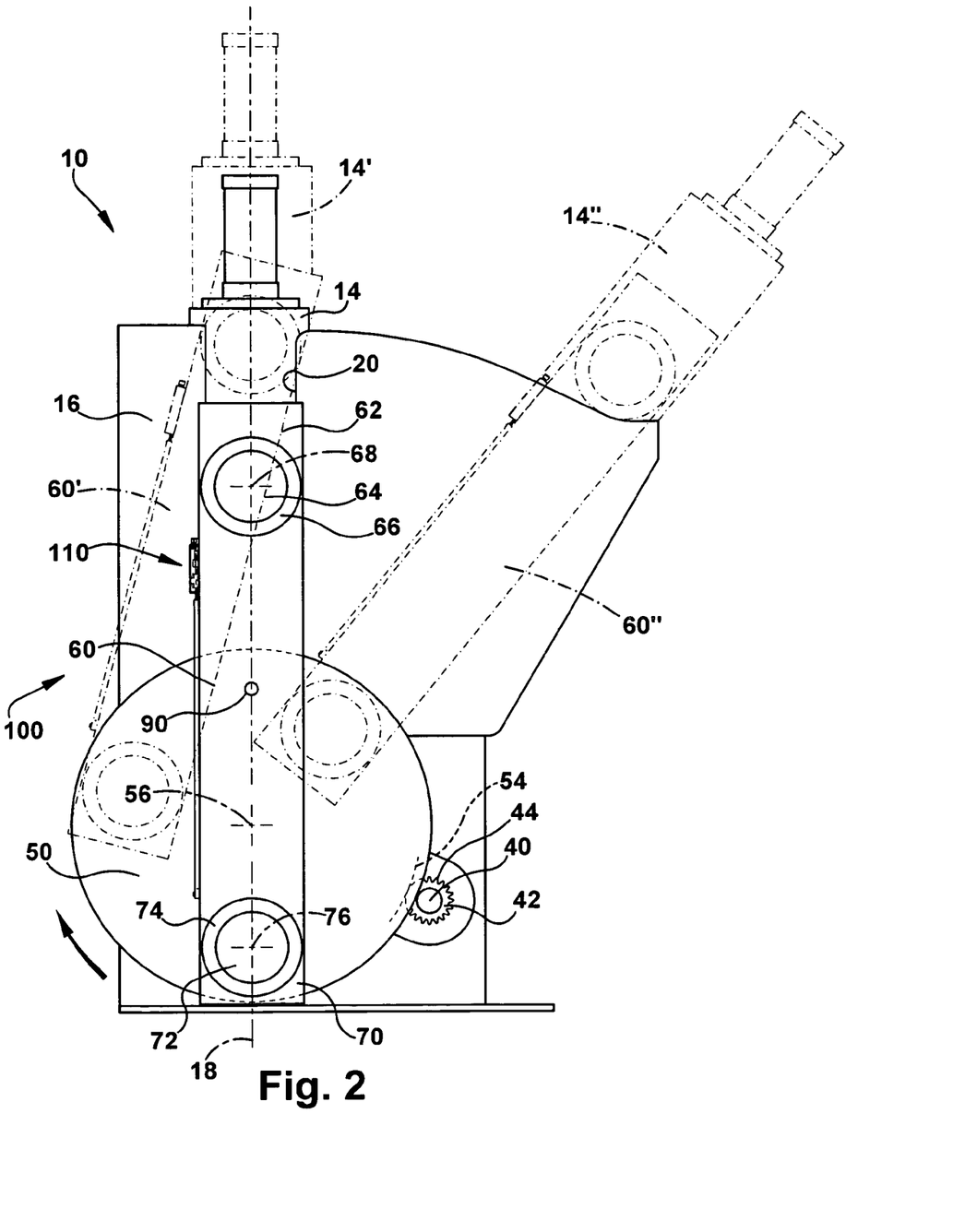
FIG. 2 is a side view of the tire curing press of FIG. 1.

The present invention relates to a mechanical press. More particularly, the present invention relates to a system, method, and apparatus for monitoring and controlling the operation of a mechanical press through strain measurement. Referring to FIGS. 1 and 2, a press 10 is outfitted with a system 100 for monitoring and controlling press operation through strain measurement. In the illustrated embodiment, the press 10 is a mechanical press that includes side links 60 for applying squeeze to one or more molds 80, as described in further detail below. Those skilled in the art will appreciate that the system 100 of the present invention may be implemented on any mechanical press that includes side links.

The press 10 includes a lower beam 12, an upper beam 14, and opposite side members 16. The lower beam 12 may serve as a base or foundation for supporting the press 10. The upper beam 14 is movable in directions generally vertically up and down as viewed in FIGS. 1 and 2 and parallel to an axis 18. The side members 16 may help limit or guide movement of the upper beam 14 in the vertical up and down directions parallel to the axis 18. For example, the side members 16 may include an opening or slot 20 along which a portion of the upper beam 14 or a component connected to the upper beam may ride.

The press 10 also includes a motor 30 with an output shaft 32 operatively connected with an input shaft 34 of a central gearbox 36. The motor 30 may be of any type or configuration suited to perform the functions described herein. For example, the motor 30 may be of the type sometimes referred to in the art as a "torque motor." Such torque motors are designed to generate relatively high torque outputs for relatively short durations. For example, a torque motor may be designed to operate for 30 seconds every ten minutes, generating full torque at one-half synchronous speed and drawing up to four times the rated motor current.

The gearbox 36 is operative to impart rotation of an output shaft 40 in response to rotation of the input shaft 34. The output shaft 40 extends along the width of the lower beam 12 (as viewed in FIGS. 1 and 3) and has opposite ends to which pinion gears 42 are fixed for rotation with the output shaft.

The press 10 also includes main crank gears 50 mounted at opposite ends of the lower beam 12. The crank gears 50 are supported on the press, e.g. on the lower beam 12 or side members 16, for rotation about an axis 56. The pinion gears 42 have gear teeth 44 that engage and mesh with gear teeth 54 on their corresponding crank gears 50. The gearbox 36, output shaft 40, and pinion gears 42 thus help define a drive train through which the motor 30 can impart rotation of the crank gears 50.

The press 10 also includes side links 60 for linking opposite ends of the upper beam 14 to the crank gears 50. A first or upper end 62 of each side link 60 is connected to its respective end of the upper beam 14 by known means, such as a pin 64 and bushing 66. The side links 60 may thus pivot or rotate relative to the upper beam 14 about an axis 68. Similarly, a second or lower end 70 of each side link 60 is connected to its respective crank gear 50 by known means, such as a pin 72 and bushing 74. The side links 60 and the crank gears 50 may thus pivot or rotate relative to each other about an axis 76.

Figure 3:
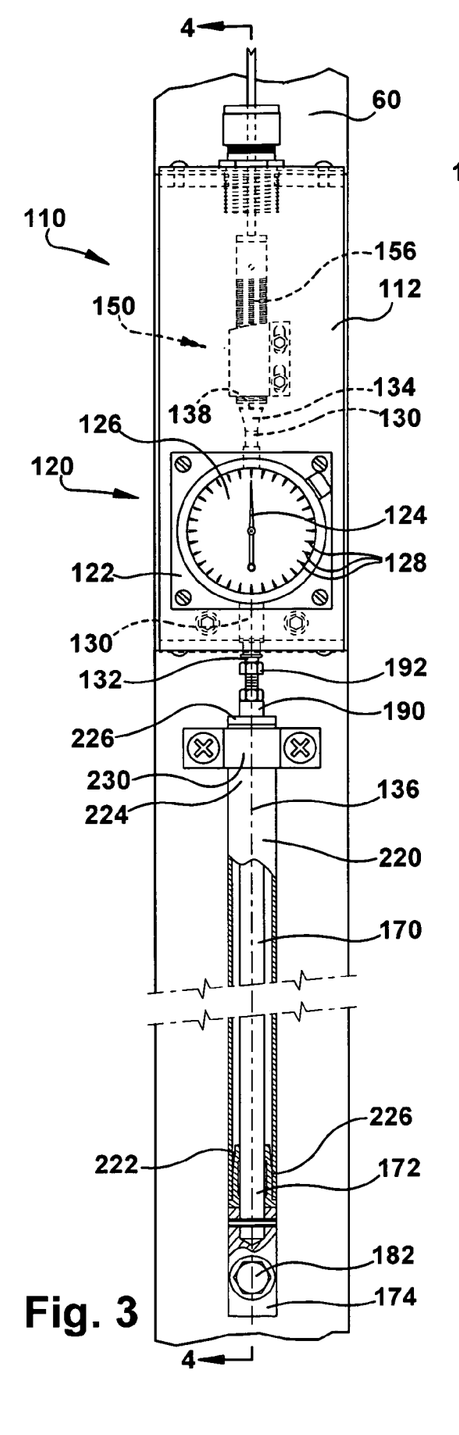
FIG. 3 is a front view of a portion of the tire curing press of FIG. 1 illustrating a portion of the monitoring and control system in further detail.

The press 10 described herein is suited for a variety of industrial processes or applications used to produce articles of manufacture. In the illustrated embodiment, the press 10 is a tire curing press for applying squeeze to one or more tire curing molds 80. In the illustrated embodiment, the press 10 is used to apply squeeze to two tire curing molds 80. As shown in FIGS. 1-3, each tire curing mold 80 includes two mold halves: an upper mold half 82 secured to the upper beam 14 and a lower mold half 84 secured to the lower beam 12. The upper mold half 82 may be secured to the upper beam 14 via a mounting assembly 86 that facilitates adjusting the vertical position of the upper mold half relative to the upper beam.

In operation, the motor 30 is energized to rotate the input shaft 34 of the gearbox 36 which, in turn, rotates the output shaft 40 and the pinion gears 42 at a speed (rpm) that is reduced from that of the input shaft 34. The pinion gears 42, being meshed with the crank gears 50, cause the crank gears to rotate about the axis 56. The crank gears 50, when rotated, are operative to impart a cranking motion of the side links 60 due to the eccentric pivoting connection between the lower ends 70 of the side links and the crank gear. This cranking motion is translated to a vertical up/down motion of the upper beam 14 under the guidance imparted to the upper beam via the slots 20 in the side members 16.

The upper mold halves 82, being connected to the upper beam 14, move in the vertical up and down direction with the upper beam. The upper mold halves 82 thus move in the vertical up/down direction relative to the lower mold halves 84 secured to the stationary lower beam 12. As the upper mold halves 82 move toward the lower mold halves 84, they eventually engage each other. Further downward movement of the upper beam 14 applies force or pressure, i.e., squeeze, to the mold 80, urging the upper and lower mold halves 82 and 84 against each other.

To operate the press 10, an operator (not shown) initially places the press in an open condition by operating the motor 30 to raise the upper beam 14, thereby separating the upper mold half 82 from the lower mold half 84. The open condition of the press 10 is shown in dashed lines in FIG. 2, with the open position of the upper beam identified at 14" and the open position of the upper mold half identified at 82". An intermediate condition of the press 10 between the open and closed conditions is identified at 14' in FIG. 2. The operator then places an un-cured or "green" tire (not shown) in the mold 80 and operates the press 10 to lower the upper beam 14 to bring the mold halves 82 and 84 together, thereby placing the press 10 in a closed condition and closing the mold 80. The closed condition of the press 10 is shown in solid lines in FIGS. 1 and 2. When the desired amount of squeeze is applied to the mold 80, a curing media, such as steam, hot water, inert gasses (e.g., nitrogen), or a combination thereof, is injected into the a bladder inside the mold to raise the tire internal pressure and cure the tire. After an appropriate cure time has expired, the internal pressure is backed off, the press 10 is placed in the open condition, and the cured tire is removed from the mold 80.

The amount of squeeze required on a particular mold 80 can vary depending on factors, such as the pressure and temperature of the media used to cure the tires, the size of the tire, type of rubber, wall thickness, and weight. It is common practice to operate a mechanical press 10 such that full squeeze is applied at a bottom dead center position of the press. The bottom dead center position refers to the condition of the press 10 when the connections between the lower ends 70 of the side links 60 and the crank gears 50 are at their lowest position. This is shown in the closed condition of the press 10, which is illustrated in solid lines in FIGS. 1 and 2. In the bottom dead center position, the pivot axis 68 of the upper ends 62 of the side links 60 and the pivot axis 76 of the lower ends of the side links are vertically aligned with each other, as shown in FIG. 2.

To achieve full squeeze at the bottom dead center position of the press 10, the upper mold halves 82 are backed-off by adjusting the mounting assemblies 86. Next, the motor 30 is operated to place the press 10 in the bottom dead center position. To aid the operator in ascertaining the bottom dead center position, the side links 60 may be fit with alignment openings 90 (FIG. 2) that align with corresponding openings (not shown) in the crank gears 50 when the bottom dead center position is reached. With the press 10 at the bottom dead center position, the mounting assemblies 86 are adjusted to bring the upper mold halves 82 into engagement with the lower mold halves 84. The press 10 is backed off the bottom dead center position and the mold halves 84 are adjusted toward each other slightly. The press 10 is then placed in the closed bottom dead center position and the squeeze is checked. If the squeeze is not yet at the desired level, the press 10 is backed off and the mold halves 84 are adjusted again. This trial-and-error process is repeated until the desired amount of squeeze is achieved. Once this initial setup is performed, the desired squeeze should be achieved every time the press 10 is operated to the bottom dead center position.

Those skilled in the art will appreciate that it may be desirable to monitor the amount of squeeze applied to the mold 80. If the squeeze is too high, the mold 80, the press 10, or both may be damaged. If the squeeze is too low, tire rubber may leak from between the mold halves (sometimes referred to as "flash"), the tire may be defective, or curing media may escape the mold. One method by which the amount of squeeze can be monitored is through the measurement and monitoring of strain in the side links 60 of the press 10.

According to the present invention, the system 100 for monitoring and controlling press operation through strain measurement includes one or more apparatus or strain gauge assemblies 110 that are responsive to or measure strain on the side links 60 to provide indication of the amount of squeeze placed on the molds 80 by the press 10. In the illustrated embodiment, a strain gauge assembly 110 is secured to each side link 60. A strain gauge assembly 110 representative of those illustrated in FIGS. 1 and 2 is shown in greater detail in FIGS. 3 and 4.

Figure 4:
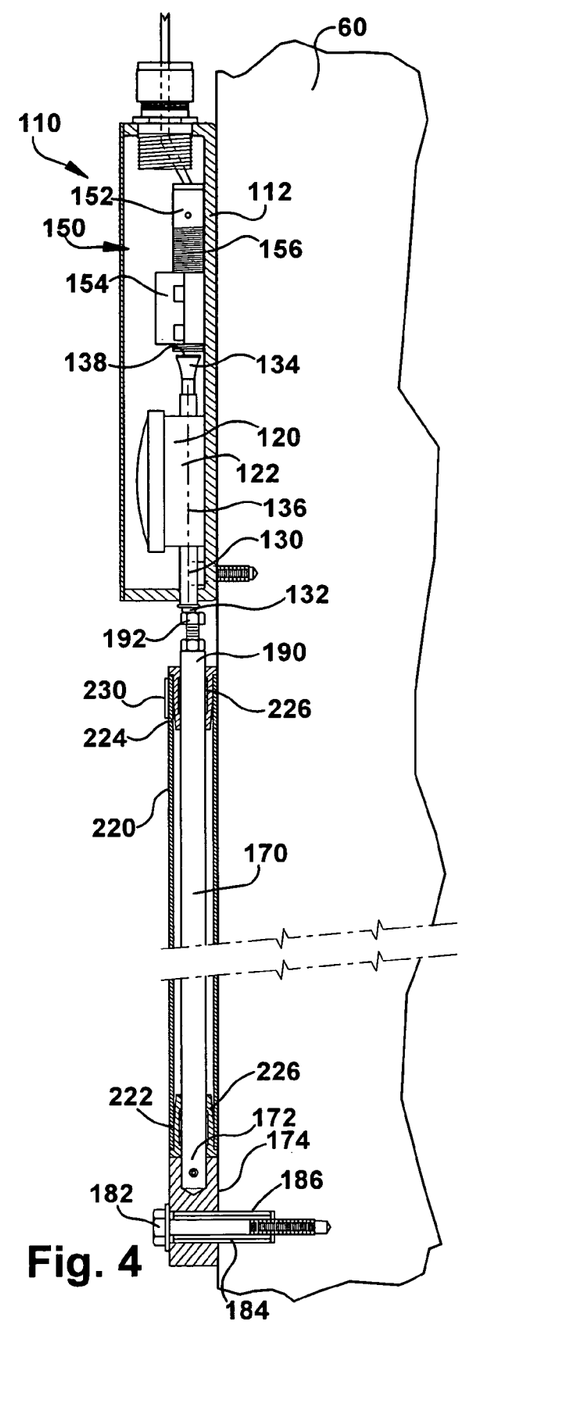
FIG. 4 is a side view of the portion of the monitoring and control system detail of FIG. 3.

Referring to FIGS. 3 and 4, the strain gauge assembly 110 includes a gauge frame or housing 112 that is secured to the side link 60 by known means, such threaded fasteners. The gauge housing 112 supports a mechanical dial indicator 120 and an electronic strain transducer 150. The dial indicator 120 includes a housing 122 that supports a mechanism (not shown) operative to rotate a dial pointer 124. The dial pointer 124 is positioned over a face 126 of the dial indicator 120 that includes indicia 128 representative of the amount of squeeze placed on the molds in suitable units, such as pounds force. The dial indicator 120 also includes a dial actuator 130 that has opposite first and second ends 132 and 134 that protrude from the dial housing 122. The dial actuator 14 is movable along an axis 136 to actuate the mechanism that rotates the dial pointer 124.

The strain transducer 150 comprises a sensor 152 mounted in a bracket 154 that is secured to the side link 60. The sensor 152 and bracket 154 may be configured to allow for adjusting the axial position of the sensor. As shown in FIGS. 3 and 4, this may be achieved via a threaded connection 156 between the sensor 152 and the bracket 154.

The sensor 152 is operative to sense the elongation of the side link 60 under squeeze conditions by sensing the position of the second end 134 of the dial actuator 130 relative to the sensor. The degree to which the side link 60 elongates under squeeze conditions is relatively small, e.g., up to 0.0050 inches. In measuring this relatively small degree of elongation, however, the sensor is exposed to harsh industrial environmental conditions, such as heat, humidity, dirt, and high electrical noise and interference, that may not be conducive to certain types of instrumentation. According to the present invention, the sensor 152 can be an inductive distance sensor capable of sensing small degrees of side link elongation in the harsh environmental conditions in which the press 10 is operated.

Inductive distance sensors are rugged and stable under extreme industrial environmental conditions. Inductive distance sensors are signal generators that, without contact, detect the presence of metallic objects and convert that presence into an electronic signal. The electronic signal output by an inductive distance sensor may be a voltage output (e.g., 0-10 VDC) or a current output (e.g., 4-20 mA). The inductive distance sensor may have short circuit protection and may be resistant to temperature drift so as to provide reliable and repeatable performance. The inductive distance sensor may have a sealed construction to protect against dust and water penetration.

In one particular example configuration, the sensor 152 may comprise a BALLUFF model M12 inductive distance sensor manufactured by BALLUFF GmbH of Neuhausen, Germany. The BALLUFF M12 inductive distance sensor has the following specifications:

Mounting: Shielded Steel/Nickel plated brass
Rated Shock: half-sinus, 30 gn, 11 ms
Rated Vibration Environment: 55 Hz, 1 mm amplitude, 3×30 min.
Linearity range: 0.5-2.0 mm
Operating Distance: 1.25 mm
Repeat Accuracy: ±6 μm
Linearity: ≦±40 μm
Limit Frequency (−3 db): 500 Hz
Measuring Velocity: ≦40 m/s
Response Time: 0.5 ms
Temperature Coefficient TK:
Typical: −0.5 μm/K
In optimized range: 3.5 μm/K
From +10-+50° C.: +4.5 μm/K
Max. Non-Linearity: ±3% from la max.
Max. Working Range Shift: ±0.125 μm
Ambient Temperature Range: −10 to +70° C.
Current Type: DC
Output Signal: 4-20 mA
Rated Operational Voltage: 24 VDC
Supply Voltage: 10-30 VDC
Rated Insulation Voltage (Ui): 250 VAC
Output Resistance: <0.5 kΩ
EMV (ESD/RFI/Burst/IVW): 4/3/4/2
Short Circuit Protection: YES
Protected Against Polarity Reversal: YES The sensor 152 is adapted to provide an electrical output signal indicative of or responsive to the sensed distance between the sensor and the second end 134 of the dial actuator 130. This signal may, for example, be a 4-20 mA signal.

The strain gauge assembly 110 also includes an elongated actuator member 170, such as a rod or bar secured to the side link 60. The actuator member 170 has a first end 172 including an end piece 174 fixed rigidly to the side link 60 at a location spaced from the gauge housing 112. As shown in FIGS. 3 and 4, the connection between the first end 172 and the side link 60 may be facilitated by a threaded connector 182 (e.g., a bolt) and an elongated sleeve or washer 184 that engage a threaded bore 186 in the side link 60. The first end 172 of the actuator member 170 could, however, be rigidly secured to the side link 60 in any suitable manner.

The actuator member 170 has a second end 190, opposite the first end 172, that is positioned proximate the first end 132 of the dial actuator 130. The second end 190 may include an adjustment screw 192 that allows for adjusting the axial position of the terminal end surface at the second end of the actuator member 170 relative to the first end 132 of the dial actuator 130. The dial indicator 120 spring biases the dial actuator 130 toward the second end 190 of the actuator member 170 against the adjustment screw 192.

As shown in FIGS. 3 and 4, the actuator member 170 is housed in an elongated sleeve or tube 220. The tube 220 has opposite first and second end portions 222 and 224 with bushings 226 secured therein by known means, such as an adhesive. The actuator member 170 has a length that is greater than the sleeve 220 and thus extends through the sleeve, leaving the first and second end portions 172 and 200 projecting outside the sleeve through the bushings 226. The first end portion 222 of the tube 220 is positioned adjacent or near the end piece 174 at the first end 172 of the actuator member 170. The second end portion 224 of the tube 220 is secured to the side link 60 by known means 230, such as a bracket.

When the press 10 is operated and applies squeeze to the molds 80, the forces applied to the side links 60 cause the side links to undergo strain, which is observable through stretching or elongation of the side links. The strain gauge assembly 110 is responsive to this elongation to provide an indication of the amount of squeeze placed on the molds 80 by the press 10. The dial indicator 120 provides a visual indication of the amount of squeeze that is responsive mechanically to the elongation of the side members 60. The strain transducer 150 provides an electronic signal responsive to the elongation of the side members 60 as sensed by the change in position of the second end 134 of the dial actuator 130 relative to the sensor 152. The electronic signal is indicative of the amount of squeeze placed on the molds 80 by the press 10. This signal may be used for a variety of purposes, such as providing visual indication for a press operator, supplying an input to a control system (e.g., a PLC controller) for safety and control purposes, and providing statistical data for logging, quality, and statistical process control purposes.

When the press 10 applies squeeze to the molds 80 and the side links 60 are tensioned and stretch or elongate, the length of the actuator member 170 remains fixed because only the first end portion 172 is fixed to the side link 60. As the tension on the side links 60 increases and the side links continue to elongate, the gauge frame 112 and the components secured to the gauge frame move away from the first end portion 172 of the actuator member 170. The dial actuator 130, being spring biased toward the actuator member 170, remains in contact with the adjustment screw 192 at the second end 190 of the actuator member. As the side link 60 elongates, the dial actuator 130 moves relative to the dial housing 122, thus actuating the mechanism that rotates the dial pointer 124 to thereby indicate the amount of squeeze placed on the molds 80 via the indicia 128 on the face 126 of the dial indicator 120.

As the dial actuator 130 moves relative to the dial housing 122 in response to the elongation of the side link 60, a terminal end surface 138 of the second end 134 of the dial actuator moves away from the position sensor 152 of the strain transducer 150. In response to this movement, the strain transducer 152 provides a signal that has a magnitude (e.g., 4-20 mA) corresponding to the degree of elongation of the side link 60.

Figure 5:
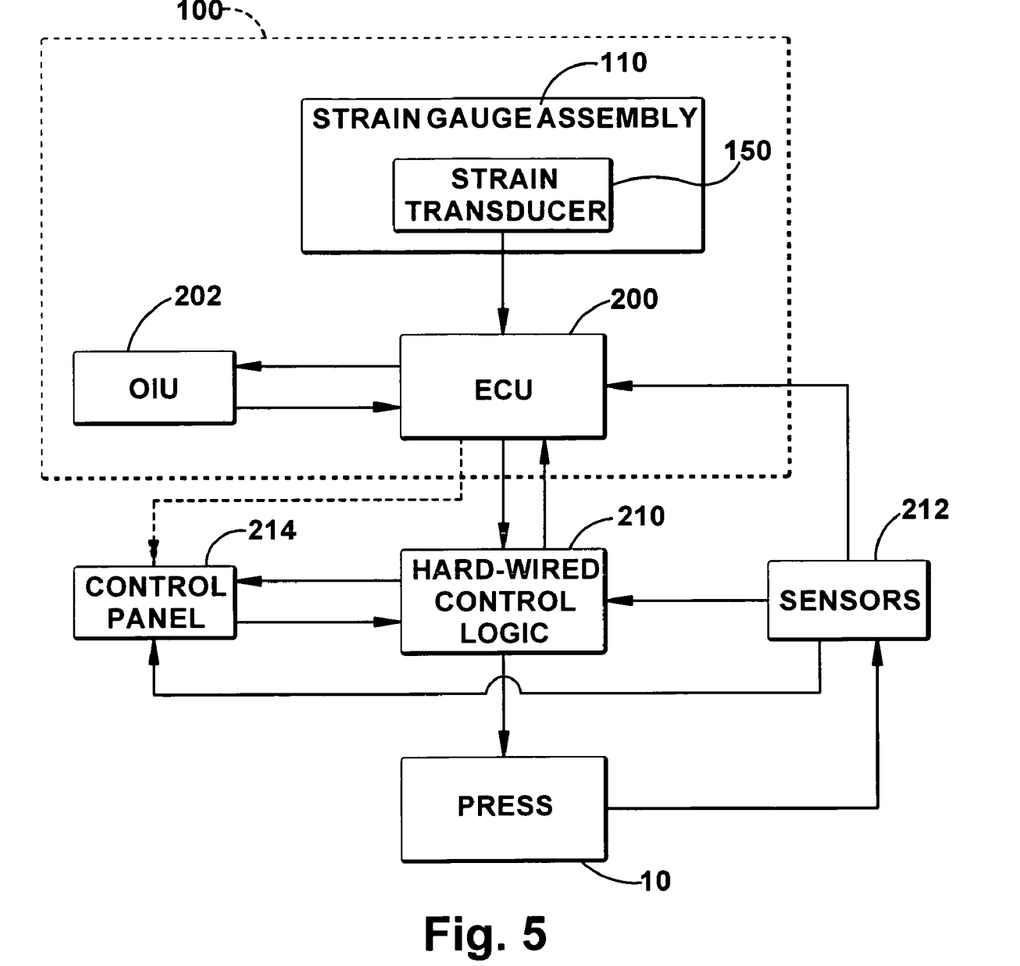
FIG. 5 is a functional block diagram depicting the monitoring and control system configured to operate the tire curing press.

Referring to FIG. 5, in addition to the strain gauge assembly 110, the system 100 includes an electronic control unit (ECU) 200 and an operator interface unit (OIU) 202. The ECU 200 may be any suitable industrial controller, such as one commonly referred to as a programmable logic controller (PLC). The OIU 202 may be any known device that provides an interface through which an operator can monitor and control operation of the ECU 200. The OIU 202 may, for example, comprise a personal computer (PC) or a unit specifically designed to interface with a particular ECU 200, such as one specifically designed to interface with a particular PLC, i.e., a PLC interface.

The press 10 may be controlled manually via operator controls, automatically via computerized controls, or a combination of manually and automatically. For example, as shown in FIG. 5, the press 10 may interface with hard-wired control logic 210 that controls the operation of the press, particularly, the motor 30 (see FIG. 1). Sensors 212 monitor the press 10 and provide hard-wired signals to the hard-wired control logic 210. A control panel 214 is wired for input and output with the hard-wired control logic 210 and may also be wired for input from the sensors 212. The control panel 214 provides an operator interface through which press function and operations may be monitored and controlled. The system 100 may be retrofitted with an existing press 10 including an existing control panel 214, control logic 210, and sensors 212. Alternatively, the system 100 may be supplied as original equipment on a newly manufactured press 10. In this latter instance, certain portions, such as the OIU 202 and control panel 214 or the ECU 200 and the control logic 210, may be combined or housed as a single unit.

The sensors 212 may be any type of sensor suited to monitor the condition or operation of the press 10. The sensors 212 may, for example, include pressure sensors or switches, limit switches, and temperature switches. The hard-wired control logic 210 may include electromechanical or solid state control devices, such as relays or motor starters, that are suited to control operation of the press 10.

The degree to which operation of the press 10 is controlled via the ECU 200 and OIU 202 may vary depending on a variety of factors. The system 100 may be configured such that operation of the press 10 may be controlled through either the ECU/OIU or the control panel 214. Alternatively, certain press operations may be reserved for operator control through the OIU 202, certain press operations may be reserved for operator control through the control panel 214, and certain press operations could be made available for operator control via the OIU 202 or the control panel 214. For example, highly experienced press operators accustomed to operating the press 10 via the hard-wired control panel 214 and logic 210 may be reluctant to rely on an ECU 200 that has been retrofitted to control the press 10. In this instance, it may be desirable to provide the capability to operate the press via the control panel 214. To this end, the strain gauge assembly 110 of the present invention simultaneously provides a visual gauge (via the dial indicator 120) and an electronic signal (via the strain transducer 150) of the amount of squeeze placed on the molds 80.

The ECU 200 may be operative to control operation of the press 10 in response to sensed mold conditions determined via the strain gauge assembly 110. The ECU 200 may also be operative to control operation of the press 10 in response to sensed mold conditions determined via the sensors 212.

According to the present invention, the ECU 200 may be operative to alarm and/or shut down the press 10 upon sensing of an over-squeeze and/or an under-squeeze condition of the press via the strain transducer 150. The ECU 200 may also be operative to alarm and/or shut down the press 10 upon sensing a predetermined squeeze differential ("unbalanced squeeze") between the side links 60.

From the above, those skilled in the art will appreciate that the present invention also relates to a method for determining the magnitude of squeeze placed on the mold 80 by the press 10. The method includes the step of providing the actuator member 170 with the first end 172 connected to the side link 60. The method also includes the step of measuring elongation of the side link via the dial indicator 120 mounted to the side link 60. The method also includes the step of measuring elongation of the side link 60 via the strain transducer 150 mounted to the side link. The method also includes the step of controlling operation of the press 10 in response to the signal provided by the sensor 152. The method also includes the step of the step of alarming and shutting down the press 10 upon sensing at least one of an over-squeeze and an under-squeeze condition of the press. The method further includes the step of alarming and shutting down the press upon sensing a predetermined squeeze differential between different side links 60.

Because the strain gauge assembly 110 associates elongation of the side links 60 under load with the amount of squeeze placed on the molds, those skilled in the art will appreciate that it may be desirable to calibrate the dial indicator 120, the strain transducer 150, or both, in order to help improve the accuracy of the squeeze indication. This is because the degree to which a side link 60 will elongate under a given load varies due to the specific characteristics of that particular side link. For example, slight variations in the overall cross-sectional area of side links 60 may result in significant variations in the degree to which those side links elongate under load. Accordingly, each strain gauge assembly 110 is calibrated to the particular side link 60 upon which it is mounted.

To calibrate the strain gauge assembly 110, a known amount of squeeze ("calibration squeeze") is applied via the press 10 to the lower and upper beams 12 and 14. This may be done in a variety of manners. For example, a hydraulic calibration unit (not shown) may be used to achieve a calibration squeeze via the press 10. The hydraulic calibration unit includes parallel plates supported relative to each other by one or more hydraulic cylinders in a hydraulic circuit including a pump and a pressure gauge calibrated to a desired degree of accuracy. The calibration unit is placed between the beams 12 and 14 halves and the press 10 is operated to the closed, bottom dead center position. The pump is then operated to pressurize the hydraulic circuit so that the hydraulic calibration unit exerts a desired calibration squeeze force on the press 10. In one particular example, the calibration squeeze applied 430,000 pounds.

To calibrate the dial indicator 120, the adjustment screw 192 on the second end 190 of the actuator member 170 is adjusted such that the appropriate indicia 128 on the dial face 126 (e.g., 430,000 pounds) aligns with the dial pointer 124. The press 10 is then opened, which causes the dial pointer 124 to rotate to a zero squeeze position which most likely does not line up with the indicia 128 associated with zero squeeze. At this point, the indicia 128 may be revised (e.g., erased or whited-out an re-drawn) to align the zero squeeze indicia with the dial pointer 124.

To calibrate the strain transducer 150, the position sensor 152 may be initially zeroed by the gap between the position sensor and the terminal end surface 138 of the second end 134 of the dial actuator 130 to a lower end of the sensor range, such as 0.010-0.015 inches. This adjustment may be performed via the threaded connection 156 between the sensor 152 and the bracket 154a. The ECU 200 then reads and records the output of the position sensor 152 as the zero squeeze output of the sensor, which should be near the lower end (e.g., 4 mA) of the sensor output range. Full calibration squeeze (e.g., 430,000 pounds) is then applied via the press 10 and the ECU 200 reads and records the output level from the position sensor 152. The full calibration squeeze condition may be determined via the dial indicator after having been calibrated as described above, or via use of the hydraulic calibration unit as described above. For example, for a position sensor 152 having a 4-20 mA output, the reading taken at the calibration squeeze may be 18 mA.

For example, where the sensor output is 18 mA at 430,000 pounds squeeze and 4 mA at zero squeeze, the output of the position sensor 152 spans 14 mA from 0-430,000 pounds. Through a simple calculation, the ECU 200 associates incremental changes in squeeze with incremental changes in the output of the position sensor 152. For example, dividing the 14 mA span by 43 associates an increase in the output of the position sensor 152 of about 0.3256 mA for every increase in squeeze of 10,000 pounds. This allows for an accurate indication of squeeze throughout the entire squeeze range. This may also provide for enhanced resolution in measuring the squeeze applied by the press 10.

Those skilled in the art will appreciate that the calibration described above in regard to the dial indicator 120 portion of the strain gauge assembly 110 may introduce inaccuracies in the scale provided by the indicia 128 between the zero squeeze and calibration squeeze positions on the dial. While the indications at zero squeeze and calibration squeeze are accurate, the fact that the indicia 128 was revised to reflect zero squeeze may affect the incremental indicia between zero and calibration squeeze. Depending on the degree of inaccuracy and the magnitude of the squeeze applied by the press 10, these inaccuracies, even if small, could be significant. For example, a ten percent error in squeeze would be 25,000 pounds when applying 250,000 pounds squeeze.

From the above, those skilled in the art will appreciate that it is desirable to provide accurate squeeze indication throughout the operating range of the press 10 in order to avoid flash or steam leakage through the molds 80 due to low squeeze or machine or mold damage due to high squeeze or uneven squeeze between the side links 60. According to the present invention, the manner in which the strain transducer 150 is calibrated, as described above, does not introduce inaccuracies. This is because the squeeze scale established by the ECU 200 uniformly distributes the calibration squeeze across the output range of the sensor 152. The system 100 of the present invention thus provides visual mechanical indication of squeeze to which press operators have become accustomed over the years and supplements this with an electronic measurement of squeeze that may provide enhanced accuracy or resolution.

Those skilled in the art, however, will also appreciate that the dial indicator 120 and the strain transducer 150 may operate independently of each other. For example, in the illustrated embodiment, the actuator member 170 and the dial actuator 130, in combination, form a single actuator member with a terminal end surface 138 that the sensor 152 senses in order to determine elongation associated with strain on the side links 60. It will therefore be appreciated that the dial indicator 120 could be eliminated and a single elongated member provided for use in conjunction with the strain transducer 150. This is shown in the embodiment of FIG. 6.

Figure 6:
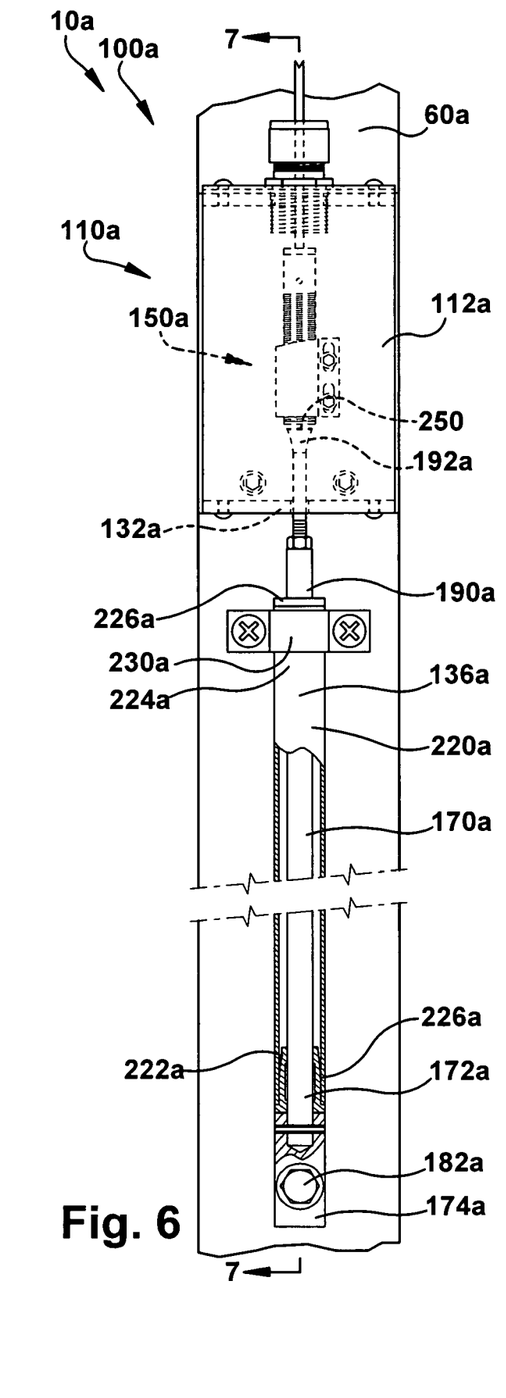
FIG. 6 is a front view of a portion of the tire curing press of FIG. 1 illustrating in detail a portion of the monitoring and control system in accordance with a second embodiment of the invention.
Figure 7:
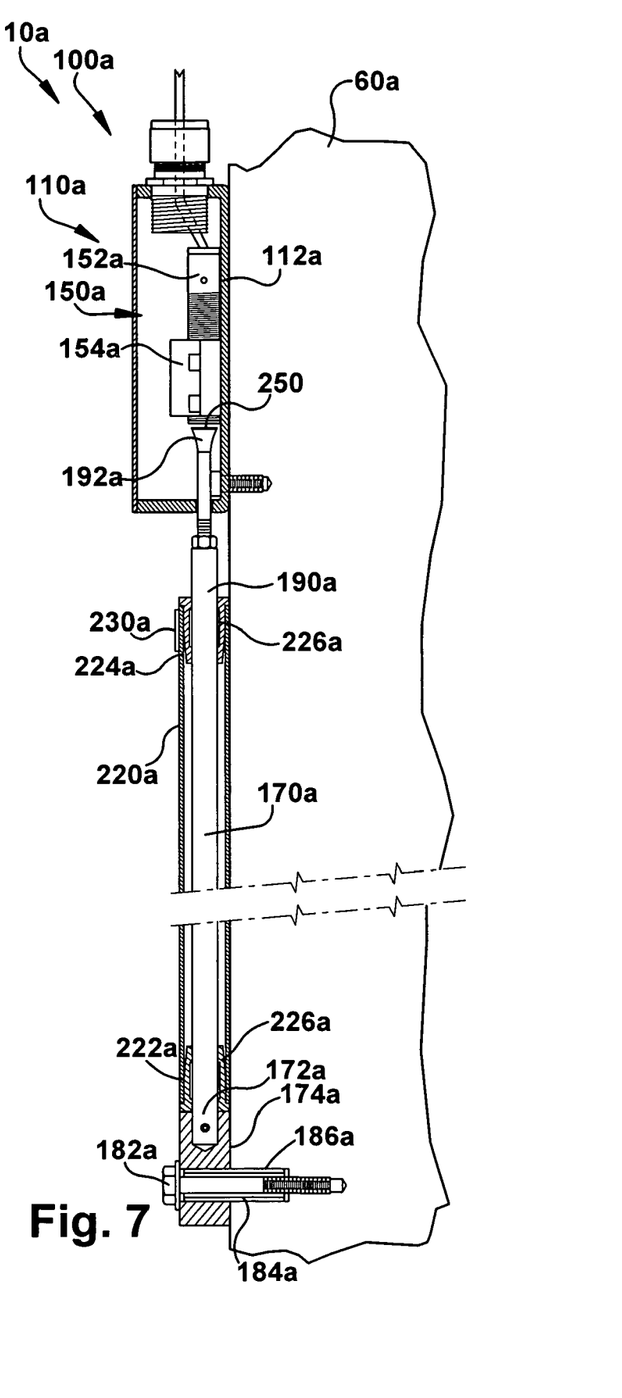
FIG. 7 is a side view of the portion of the monitoring and control system detail of FIG. 6.

FIGS. 6 and 7 illustrate a portion of the press monitoring and control system in accordance with a second embodiment of the present invention. The portion of the press monitoring and control system of FIGS. 6 and 7 is similar to the portion of the press monitoring and control system of FIGS. 3 and 4. Accordingly, FIGS. 6 and 7 use similar reference numbers to identify corresponding elements identified in FIGS. 3 and 4, the suffix "a" being used in FIGS. 6 and 7 to avoid confusion.

Referring to FIGS. 6 and 7, the monitoring and control system 100a for the press 10a includes a strain gauge assembly 110a. The strain gauge assembly 110a includes a gauge frame or housing 112a that is secured to the side link 60a by known means, such threaded fasteners. The gauge housing 112a supports an electronic strain transducer 150a. The strain transducer 150a comprises a sensor 152a mounted in a bracket 154a that is secured to the side link 60a. The sensor 152a and bracket 154a may be configured to allow for adjusting the axial position of the sensor. As shown in FIGS. 6 and 7, this may be achieved via a threaded connection 156a between the sensor 152a and the bracket 154a. The sensor 152a can be an inductive distance sensor, as described above in regard to the first embodiment.

The strain gauge assembly 110a also includes an elongated actuator member 170a, such as a rod or bar, secured to the side link 60a. The actuator member 170a has a first end 172a including an end piece 174a fixed rigidly to the side link 60a at a location spaced from the gauge housing 112a. As shown in FIGS. 6 and 7, the connection between the first end 172a and the side link 60a may be facilitated by a threaded connector 182a (e.g., a bolt) and an elongated sleeve or washer 184a that engage a threaded bore 186a in the side link 60a. The first end 172a of the actuator member 170a could, however, be rigidly secured to the side link 60a in any suitable manner.

The actuator member 170a has a second end 190a, opposite the first end 172a, that is positioned proximate the first end 132a of the dial actuator 130a. The second end 190a may include an adjustment screw 192a that allows for adjusting the axial position of a terminal end surface 250 relative to the sensor 152a. As shown in FIGS. 6 and 7, the actuator member 170a is housed in an elongated sleeve or tube 220a. The tube 220a has opposite first and second end portions 222a and 224a with bushings 226a secured therein by known means, such as an adhesive. The actuator member 170a has a length that is greater than the sleeve 220a and thus extends through the sleeve, leaving the first and second end portions 172a and 200a projecting outside the sleeve through the bushings 226a. The first end portion 222a of the tube 220a is positioned adjacent or near the end piece 174a at the first end 172a of the actuator member 170a. The second end portion 224a of the tube 220a is secured to the side link 60a by known means 230a, such as a bracket.

The sensor 152a is adapted to provide an electrical output signal indicative of or responsive to the sensed distance between the sensor and the terminal end surface 250 of the actuator member 170a. This signal may, for example, be a 4-20 mA signal. The signal provided by the sensor 152a may be used to control operation of the press 10a in the manner described above in regard to the first embodiment.

From the above description of the invention, those skilled in the art will perceive improvements, changes and modifications. Such improvements, changes and modifications within the skill of the art are intended to be covered by the appended claims.

Having described the invention, the following is claimed:

1. A system for controlling the operation of a mechanical press having a side link for applying squeeze to a mold, the system comprising:
    a dial indicator mounted to the side link;
    an actuator member having a first end connected to the side link and an opposite second end engaging the dial indicator, the actuator member being configured to move relative to the side link and actuate the dial indicator in response to elongation of the side link, the dial indicator indicating the magnitude of the squeeze applied by the side link; and
    a strain transducer mounted to the side link, the strain transducer comprising a sensor operative to provide a signal responsive to movement of the actuator member relative to the side link.

2. The system recited in claim 1, further comprising a controller for receiving the signal from the sensor and determining the magnitude of the squeeze applied by the side link in response to the signal, the controller being operative to control operation of the press in response to the determined squeeze.

3. The system recited in claim 1, wherein the dial indicator includes a dial actuator, the actuator member being configured to cause axial displacement of the dial actuator in response to elongation of the side link.

4. The system recited in claim 3, wherein the sensor is operative to sense an axial position of the dial actuator, the axial position of the dial actuator being responsive to the movement of the actuator member relative to the side link.

5. The system recited in claim 3, wherein the dial actuator has an elongated configuration with opposite first and second end portions protruding from a housing of the dial indicator, the actuator member being configured to engage the first end of the dial actuator to cause axial displacement of the dial actuator in response to elongation of the side link, the sensor being configured to sense the axial position of the second end of the dial actuator.

6. The system recited in claim 1, wherein the press comprises a tire curing press including an upper beam and a lower beam for supporting at least one tire curing mold, the side links being operative to move the upper beam relative to the lower beam to open, close, and apply squeeze to the at least one tire curing mold.

7. The system recited in claim 2, wherein the controller is operative to at least one of alarm and shut down the press upon sensing at least one of an over-squeeze condition of the press, an under-squeeze condition of the press, and a predetermined squeeze differential between side links of the press.

8. The system recited in claim 1, wherein the sensor comprises an inductive distance sensor.

9. An apparatus for indicating squeeze placed on a mold by a press having a side link for applying the squeeze, the apparatus comprising:
    a dial indicator mounted to the side link and including a dial actuator;
    an actuator member having a first end connected to the side link and an opposite second end engaging the dial indicator, the actuator member being configured to displace the dial actuator in response to elongation of the side link when applying squeeze, the dial actuator actuating the dial indicator in response to the displacement and causing the dial indicator to indicate the magnitude of the squeeze applied by the side link; and
    a strain transducer mounted to the side link, the strain transducer comprising a sensor operative to provide a signal responsive to the displacement of the dial actuator, the signal being indicative of the magnitude of the squeeze applied by the side link.

10. The apparatus recited in claim 9, wherein the dial actuator has an elongated configuration with opposite first and second end portions protruding from a housing of the dial indicator, the actuator member being configured to engage the first end of the dial actuator to cause axial displacement of the dial actuator in response to mechanical strain on the side link, the sensor being configured to sense the axial position of the second end of the dial actuator.

11. The apparatus recited in claim 9, wherein the press comprises a tire curing press including an upper beam and a lower beam for supporting at least one tire curing mold, the side links being operative to move the upper beam relative to the lower beam to open, close, and apply squeeze to the at least one tire curing mold.

12. The apparatus recited in claim 9, further comprising a controller operative to control operation of the press in response to the signal provided by the strain transducer.

13. The apparatus recited in claim 12, wherein the controller is operative to at least one of alarm and shut down the press upon sensing at least one of an over-squeeze condition of the press, an under-squeeze condition of the press, and a predetermined squeeze differential between different side links of the press.

14. A method for determining the amount of squeeze placed on a mold by a press having a side link for applying the squeeze, the method comprising the steps of:

providing an actuator member having a first end connected to the side link;

measuring elongation of the side link via a mechanical dial indicator mounted to the side link, the dial indicator including a dial actuator for actuating the dial indicator, the actuator member having a second end that engages the dial actuator to cause axial displacement of the dial actuator in response to elongation of the side link when applying squeeze; and measuring elongation of the side link via a strain transducer mounted to the side link, the strain transducer comprising a sensor operative to provide a signal responsive to the axial displacement of the dial actuator, the signal being indicative of the magnitude of the squeeze applied by the side link.

15. The method recited in claim 14, further comprising the step of controlling operation of the press in response to the signal provided by the sensor.

16. The method recited in claim 15, wherein the step of controlling operation of the press comprises the step of alarming and shutting down the press upon sensing at least one of an over-squeeze condition of the press, and an under-squeeze condition of the press, and a predetermined squeeze differential between different side links of the press.

* * * * *